(12) United States Patent
Guarino et al.

(10) Patent No.: US 7,588,740 B1
(45) Date of Patent: Sep. 15, 2009

(54) METHOD FOR IN-SITU MODERNIZATION OF A HETEROGENEOUS SYNTHESIS REACTOR

(75) Inventors: Giuseppe Guarino, Cadro (CH); Ermanno Filippi, Castagnola (CH)

(73) Assignee: Ammonia Casale S.A., Lugano Besso (CH)

( * ) Notice: Subject to any disclaimer, the term of this patent is extended or adjusted under 35 U.S.C. 154(b) by 467 days.

(21) Appl. No.: 09/231,791

(22) Filed: Jan. 15, 1999

(30) Foreign Application Priority Data

Jan. 16, 1998 (EP) .................................. 98200114

(51) Int. Cl.
*B01J 8/02* (2006.01)
(52) U.S. Cl. ..................... 422/218; 422/211; 422/220
(58) Field of Classification Search ................. 422/181, 422/187, 192, 195, 211, 218, 194, 196, 197
See application file for complete search history.

(56) References Cited

U.S. PATENT DOCUMENTS

| 4,405,562 | A | * | 9/1983 | Zardi et al. | ................. 422/148 |
| 4,421,723 | A | * | 12/1983 | Farnham | ...................... 422/218 |
| 5,202,097 | A | * | 4/1993 | Poussin | ....................... 422/218 |
| 5,372,792 | A | * | 12/1994 | Mueller et al. | .............. 422/218 |

FOREIGN PATENT DOCUMENTS

EP 0650760 5/1995

* cited by examiner

*Primary Examiner*—Jennifer A Leung
(74) *Attorney, Agent, or Firm*—Sughrue Mion, PLLC

(57) ABSTRACT

A method for in-situ modernization of a heterogeneous synthesis reactor, comprises the steps of providing an unperforated cylindrical wall (15) coaxial to the gas outlet wall (8) in a catalytic bed (6) of the radial or axial-radial type, the unperforated cylindrical wall (15) extending from an upper end (8a) of the gas outlet wall (8) for a portion of the same of a prefixed length, so as to define a free-space (16) between the gas outlet wall (8) and the unperforated wall (15), for the passage of a part of the gas leaving said catalytic bed (6), and of providing means of closing the free-space (16) between the unperforated wall (15) and the gas outlet wall (8), in proximity of the upper end (8a) of the latter, preventing thereby a bypass of the catalytic bed or a recycling to the same of the gas entering respectively leaving the reactor. Thanks to the above steps, the present method allows to operate with a reduced amount of catalyst in the catalytic bed, keeping however the fluid dynamics and pressure drop characteristics unchanged.

5 Claims, 1 Drawing Sheet

METHOD FOR IN-SITU MODERNIZATION OF A HETEROGENEOUS SYNTHESIS REACTOR

APPLICATION FIELD

The present invention relates to a method for in-situ modernization of a heterogeneous synthesis reactor, in particular for the exothermic synthesis such as ammonia or methanol synthesis and the conversion of carbon monoxide, including at least a catalytic bed of the radial or axial-radial type, provided with opposite cylindrical perforated walls for the inlet and outlet of gases.

In the description given below and in the following claims, the term: "in-situ modernization", is understood to mean the on-site modification of a pre-existing reactor in order to improve its performances and obtain e.g. a production capacity and/or a conversion yield comparable to those of a newly-built reactor.

In the terminology of the field, this type of modernization is also termed retrofitting or revamping.

As is known, in the field of heterogeneous synthesis reactions in general, the need is increasingly felt of adapting the pre-existing synthesis reactors to the catalysts of new conception with always increasing reaction activity, in order to achieve an improvement in the conversion yield and a reduction in energy consumption, while lowering investment costs.

In fact, the continuous progress in the realisation of high activity catalysts has caused—the production capacity of the reactor being the same—the catalyst mass to be loaded in the respective bed to be markedly lower than the maximum filling volume for which the bed was designed, allowing therefore savings in the cost of said catalyst.

PRIOR ART

In pre-existing reactors provided with catalytic beds of the axial type, the adaptation of the reactor to the new high reaction activity catalysts does not cause special problems, as the catalytic bed(s) may be loaded with a more or less high quantity of catalyst without involving substantial modifications in the running of the same—in particular from the fluid dynamics point of view—except for a different pressure drop than can be anyhow regulated by suitably modifying the operating conditions of the reactor.

In pre-existing reactors comprising catalytic beds of the radial or axial-radial type, the loading of a catalyst mass different from the design mass involves on the contrary severe drawbacks in the running of the catalytic bed(s).

A catalytic bed of the radial type only partly filled with catalyst, unavoidably presents rows of holes in the gas inlet and outlet walls which are uncovered in the upper part of the bed, with ensuing undesired bypass of the same by the reaction gases and a corresponding drastic reduction in the reactor conversion yield.

The same problem arises in a catalytic bed of the axial-radial type, wherein there also lacks the axial crossing of the catalyst by the reaction gases, which involves a further reduction in the conversion yield compared to an optimal loaded catalytic bed.

In particular, the presence of a reduced amount of catalyst in the axial-radial bed, besides uncovering a part of the holes of the perforated gas inlet and outlet walls, thwarts the function performed by the unperforated portion of the upper part of the gas outlet wall of axially routing the gases entering said bed.

Even though the so-called retrofitting of existing reactors has become increasingly accepted, which technique aims at avoiding an expensive replacement of the latter while achieving at the same time the maximum conversion yield and the minimum energy consumption compatible with the available reaction volume, no methods have been proposed as at today allowing the adaptation of existing reactors provided with catalytic beds of the radial or axial-radial type that can satisfy the above need.

At present, lacking valid technical solutions, the radial or axial-radial catalytic beds of existing reactors are still loaded with conventional catalysts, to the detriment of the improvement in conversion yield and energy consumption, which would be instead achievable by utilising the new high reaction activity catalysts.

Otherwise, i.e. by using a high activity catalyst, it is always necessary to fill the available volume of the radial or axial-radial catalytic bed entirely, in order to prevent the aforementioned drawbacks, and accordingly there is obtained—besides an increase in the conversion yield—also an increase in the production capacity of the existing reactor that is not always required or desired, as such increase may for instance involve a replacement of the apparatuses located downstream of the synthesis reactor, which would be otherwise under-sized, with related high investment and construction costs.

Besides, filling the whole volume available in the existing catalytic beds which have been so designed as to be suitable to contain a conventional lower activity catalyst, requires an amount of high activity catalyst such as to render the investment cost prohibitive.

Because of these very drawbacks, the utilisation of high activity catalysts in pre-existing heterogeneous synthesis reactors comprising catalytic beds of a radial or axial-radial type, has not had till now a concrete application, even though the need is increasingly felt in the field.

SUMMARY OF THE INVENTION

The problem underlying the present invention is that of providing a method for modernizing a heterogeneous synthesis reactor of the type comprising at least a radial or axial-radial bed such as to allow to use of new conception catalysts having always greater reaction activity, in order to achieve an improvement in conversion yield and a reduction in energy consumption, in a simple and reliable way and to low investment and operating costs.

Said problem is solved by a method of the type set forth above, characterised in that it comprises the following steps:
  providing an unperforated cylindrical wall coaxial to said gas outlet wall in said catalytic bed, said unperforated cylindrical wall extending from an upper end of said gas outlet wall for a portion of the same of a prefixed length, so as to define a free-space between the gas outlet wall and the unperforated wall, for the passage of a part of the gas leaving said catalytic bed;
  providing means of closing said free-space between the unperforated wall and the gas outlet wall, in proximity of the upper end of the latter, preventing thereby a bypass of said catalytic bed or a recycling to the same of the gas entering respectively leaving the reactor.

Advantageously, the method according to the present invention allows a partial loading of the pre-existing radial or axial-radial catalytic bed(s), allowing in this way an effective utilisation of the new high activity catalysts, without affecting the running of the beds adversely, in particular keeping the fluid dynamics and pressure drop characteristics of the same unchanged.

In fact, thanks to presence of an unperforated wall of a prefixed length near the upper zone of the gas outlet wall and the simultaneous formation of a free-space between the unperforated wall and the gas outlet wall, it is advantageously possible to reach a twofold aim, expounded hereunder.

On the one hand, the unperforated wall allows to route into the catalytic mass the gas flow entering the beds, preventing thereby the formation of undesired bypasses, i.e. preventing gas from flowing directly through the holes of the gas outlet wall caused to be uncovered because of the only partial filling of the catalytic beds, without passing through the catalyst.

On the other hand, the presence of the free-space allows the gas flow that has passed through the catalytic mass from escaping through all of the holes of the gas outlet wall, so as to keep the pressure drop through the catalytic bed(s) unchanged.

Particularly satisfactory results have been achieved by providing an unperforated wall that extends for a portion comprised between 5% and 50% the length of the gas outlet wall, respectively defining a substantially annular free-space having a thickness comprised between 0, 5 and 10 cm.

In this way it is possible to load even relatively low amounts of high activity catalyst, without the risk of undesired catalytic bed bypasses by the synthesis gas, while keeping unchanged the fluid dynamics and pressure drop characteristics preceding the retrofitting.

With reference to the present invention, it is worth stressing that being able to conceive an only partial loading of the catalyst in a catalytic bed of the radial or axial radial type—without affecting thereby the running of the same adversely—is in sharp contrast with the constant teaching of the prior art according to which the use of radial or axial-radial catalytic beds inevitably involves a full filling of the same with catalyst, to prevent beds from being undesirably bypassed by reaction gases.

In fact, because of the very intrinsic characteristics of such beds, loading only partly a radial or axial-radial catalytic bed was inconceivable according to the prior art.

Only after the research of the applicant, it has been possible to solve the aforementioned technical problem, by proposing a modernization of the pre-existing catalytic radial or axial-radial beds that allows—contrary to the teaching of the prior art—a partial loading of the same.

The characteristics and advantages of the invention are set forth in the description of an example of implementation of a modernization method in accordance with the invention, given hereinbelow by way of non-limiting illustration with reference to the annexed drawing.

BRIEF DESCRIPTION OF THE DRAWING

The sole FIGURE shows schematically a longitudinal section of an existing reactor for carrying out heterogeneous synthesis reactions, suitably modified according to the modernization method of the present invention.

DETAILED DESCRIPTION OF A PREFERRED EMBODIMENT

Figure 1:
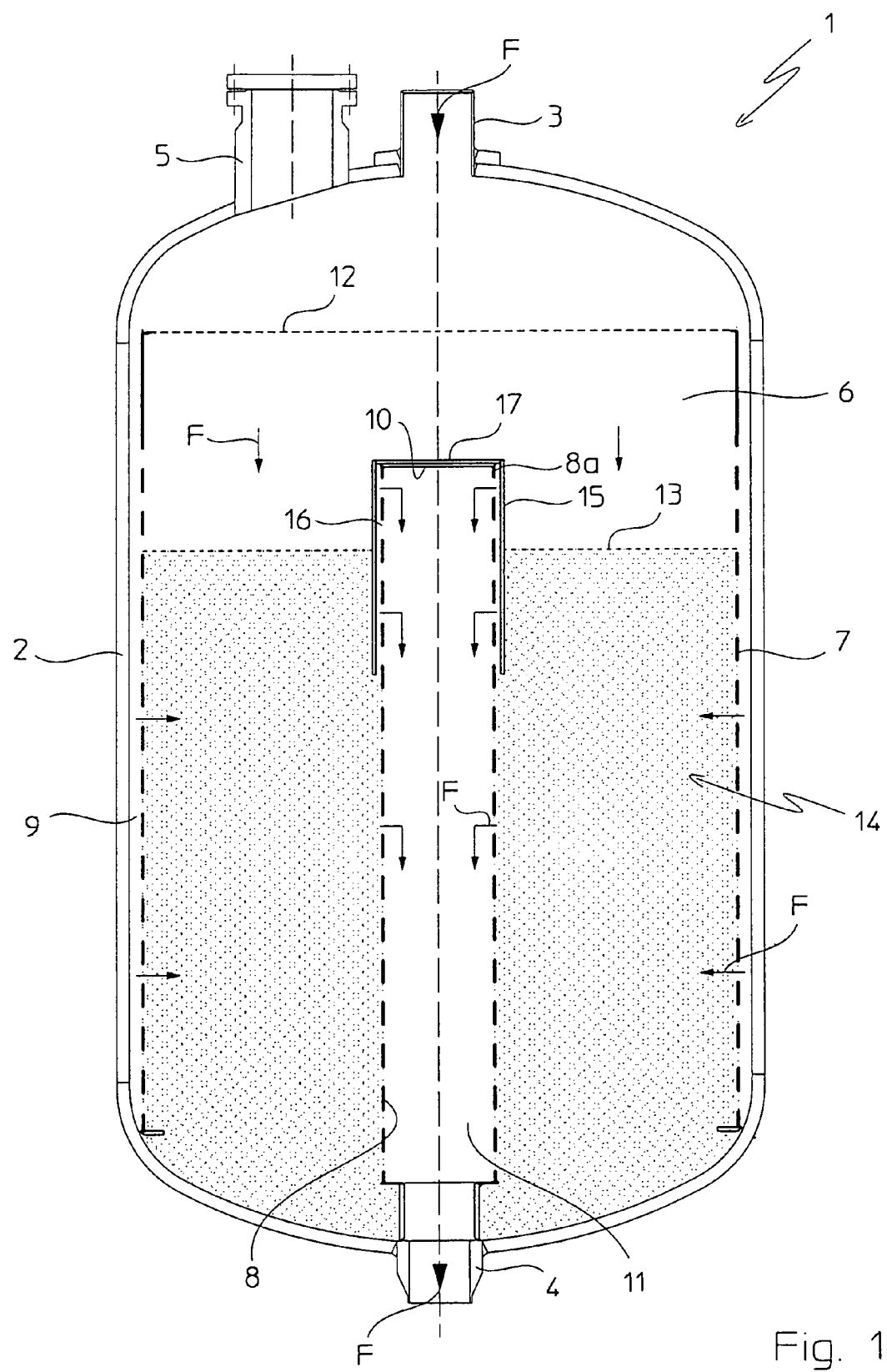

With reference to the drawing, reference 1 indicates as a whole an heterogeneous synthesis reactor.

Reactors of this type are especially suitable for carrying out exothermic heterogeneous synthesis reactions at high pressure and temperature (20-300 bar, 180-550° C.), for instance for the production of ammonia or methanol or for the conversion of carbon monoxide into carbon dioxide.

Reactor 1 comprises a tubular envelope or shell 2, provided at the top with a nozzle 3 for the inlet of the reaction gases and at the bottom with a nozzle 4 for the outlet of the reaction products.

Shell 2 is also provided at the top with a nozzle 5 to allow the passage of a worker in the inside of reactor 1 to carry out the various operations of assembly and maintenance of the same. Nozzles of this type are generally known to those skilled in the art by the jargon name of "manholes".

In the inside of shell 2 a catalytic bed 6 of the axial-radial type is obtained, defined sideways by a gas inlet cylindrical perforated wall 7 and a gas outlet cylindrical perforated wall 8, and underneath by the bottom of the shell 2.

The catalytic bed 6 is not closed at the top to allow a portion of the reaction gases axially cross the catalytic bed 6. To prevent undesired catalyst leakages, containment nets—generally known to those skilled in the art and therefore not shown—may be installed in the catalytic bed 6.

In the example of FIG. 1, the gas inlet wall 7 is located near shell 2, while the gas outlet wall 8 is located in the middle of reactor 1. Between shell 2 and gas inlet wall 7 a free-space 9 is obtained to allow a radial crossing of bed 6 by the reaction gases. Gas outlet wall 8 is also closed at the top by a gas-tight lid 10, of a known type.

A chamber 11, extended coaxial to the catalytic bed 6, between wall 8 and lid 10, is lastly provided in reactor 1, for routing the reaction products leaving said bed to nozzle 4, through which they are finally evacuated.

The broken line 12 shown in proximity of the upper end of the gas inlet wall 7 delimits the highest level that can be reached by the catalyst in the inside of the catalytic bed 6, and defines, together with walls 7 and 8 and the bottom of the shell 2, the reaction volume available in reactor 1.

Such volume has been calculated based on the reaction activity of the catalyst commercially available at the time of the design of reactor 1, to achieve a predetermined production capacity.

Therefore, before being modernized according to the present invention, reactor 1 still had a catalytic bed 6 whose volume was entirely taken up by a conventional catalyst.

On the contrary, the broken line 13 indicates the level reached by the catalyst in reactor 1 advantageously modernized according to the present invention.

The catalyst in the inside of bed 6 is indicated—as a whole—by 14 and has a reaction activity such as to provide a production capacity of the reactor equivalent to the design capacity, but taking up a volume substantially smaller than the volume of the catalytic bed 6.

In other words, thanks to the greater reaction activity, the mass of catalyst 14 loaded in the reactor once the latter is modernized in accordance with the invention results to be—the production capacity being the same—much smaller than the catalyst mass employed before the modernization, accordingly involving savings in the catalyst cost.

Arrows F of FIG. 1 indicate the various routes followed by the gas through the catalytic bed 6.

According to a first step of the modernization method of the present invention, there is provided a substantially cylindrical unperforated wall 15 co-axial to the gas outlet wall 8 in the catalytic bed 6. The unperforated wall 15 protrudes from an upper end 8a of the gas outlet wall 8 for a pre-fixed portion of the same, so as to define an annular free-space 16 between the gas outlet wall 8 and the unperforated wall 15, for the passage of a part of the gas leaving said catalytic bed 6, as indicated by arrows F of the drawings.

In a further step for the present method, means are provided of closing the free-space 16 between the unperforated wall 15 and the gas outlet wall 8, in proximity of the upper end 8a of the latter, preventing thereby the bypass of the catalytic bed 6 or the recycling of the gases entering or leaving the reactor.

Thanks to the steps of providing an unperforated wall near the upper end of the gas outlet wall, and of defining a free-space between said walls for the passage of reacted gases, it is advantageously possible to load the catalytic bed with amounts of catalyst substantially lower than the design amounts, without affecting the running of the same adversely, in particular keeping its fluid dynamics and pressure drop characteristics unchanged.

In fact, even though the level of catalyst 14 remains well beneath the upper end 8a of the gas outlet wall 8 (broken line 13) thereby leaving several holes of the wall 8 uncovered, the unperforated wall 15 prevents gas reagents from crossing the catalytic bed 6 without penetrating into the catalytic mass, and free-space 16 allows the utilization of all the holes of wall 8 as outlets for the reaction products.

Should unperforated wall 15 be in touch directly with gas outlet wall 8—without the formation of free-space 16—a catalytic bed would be obtained having the same fluid dynamics characteristics as the non-modernized bed, but, due to the reduction in the number of holes available for the outlet of the reaction products, the pressure drop would be increased.

In the example of the drawing, unperforated wall 15 extends advantageously for a portion comprised between 20% and 40% the length of gas outlet wall 8. In practice, wall 15 extends preferably for such a length as to re-create in the catalytic bed 6, only partly loaded with catalyst 14, a zone prevailingly axially crossed by the reaction gases.

Was the catalytic bed 6 of a merely radial type, wall 15 would arrive barely beyond the broken line 13 which defines the level reached by catalyst 14, so as to ensure a substantially radial crossing of the catalytic bed.

Moreover, the free-space 16 is preferably so defined as to have a thickness comprised between 1 and 5 cm. In any case, the thickness of free-space 16 must be great enough to allow gas crossing without causing an additional pressure drop.

Advantageously, free-space 16 is closed in proximity of the upper end 8a of the gas outlet wall, so as to prevent undesired bypasses of gas reagents entering the catalytic bed 8 or the recycling to the same of reaction products.

In order to simplify as much as possible the implementation of the present modernization method, the unperforated wall 15 is suitably supported by the gas outlet wall 8.

For instance, wall 15 may be removably fixed to wall 8 through special supporting means hooked to the latter in proximity of its upper end 8a.

In particular, according to a preferred embodiment of the invention, shown in the drawing, the unperforated wall 15—whose diameter is greater than the gas outlet wall 8—is advantageously supported by a horizontal gas-tight baffle 17 which protrudes above the upper end 8a of the gas outlet wall 8 and rests on the same.

Advantageously, wall 15 and baffle 8 form a kind of gas-tight glass—for instance made from unperforated plate—which rests upside down on lid 10 of the gas outlet wall 8.

Upon conclusion of said steps, a reactor 1 is obtained which allows the performance of heterogeneous synthesis reactions with high conversion yields and at low energy consumption, in the following way.

Gas reagents, let into reactor 1 through nozzle 3, are fed to the catalytic bed 6 comprising a high activity catalyst 14.

Depending on the type of reaction, the temperature and pressure of the gas reagents fed to the catalytic bed 6 are regulated downstream of reactor 1.

The gas reagents cross the catalytic bed 6 with an axial-radial centripetal flow. Thanks to the presence of the unperforated wall 15, it is possible to deviate the flow of gas reagents axially, preventing undesired bypasses of the catalytic bed 6.

The reaction products obtained in the catalytic bed 6 cross the gas outlet wall 8 and are afterwards collected in chamber 11, to finally leave reactor 1 through nozzle 4. A (minority) part of the reaction products advantageously flows along free-space 16 which allows in this way usage of the part of wall 8 circumscribed by wall 15 for the outlet of gases.

In so doing, it is possible—the production capacity of the pre-existing reactor being the same—to load only partly the catalytic bed 6 with a high reaction activity catalyst, obtaining savings in the cost of said catalyst, and keeping at the same time the fluid dynamics and pressure drop characteristics of the catalytic bed unchanged.

If an increase in the production capacity of the pre-existing reactor should be required—which would involve the necessity of fully exploiting the available volume of the catalytic bed 6, loading the same with a high-activity catalyst—it would suffice to take out from the reactor the unperforated wall 15, and consequently also baffle 17 that supports the same, to bring back the catalytic bed 6 to its original configuration.

The present invention is advantageously applicable especially in the fields of heterogeneous synthesis reactions where the technological progress has allowed to develop new catalysts having always increasing reaction activities.

A very interesting field is without any doubt the field of ammonia synthesis where, thanks to the present method, it is now possible to effectively modernize the pre-existing reactors so as to use high activity catalysts such as graphite supported ruthenium-based catalysts.

Another particularly interesting field is the field of carbon monoxide conversion, where the pre-existing reactors (for instance of the type shown in FIG. 1) may be advantageously loaded with reduced volumes of high activity catalysts, such as for instance copper-comprising catalysts for high temperature conversion.

However, the modernization method according to the present invention is not limited to the type of reactor described above with reference to FIG. 1, but may be also applied to reactors comprising a plurality of radial or axial-radial beds supported for instance in the inside of an appropriate cartridge.

Besides, for the purposes of the implementation of the present method it does not matter at all whether the catalytic bed is crossed by the reaction gases with a centripetal or a centrifugal flow. In the latter instance, the gas outlet wall 8 would be near shell 2 and the unperforated wall 15 would have a diameter smaller than the diameter of wall 8.

The present invention can be obviously exploited also when a reduction in the production capacity of the existing reactor is desired, and therefore when a reduction in the mass of the (low yield) conventional catalyst to be loaded in the reactor is required.

From what has been expounded hereinabove, the many advantages achieved by the present invention become apparent; in particular, it is possible to load only partly a catalytic bed of the radial or axial-radial type of a pre-existing reactor, obtaining in this way a saving in the cost of the catalyst, without affecting thereby the running of the reactor adversely.

The invention claimed is:

1. A heterogeneous synthesis reactor comprising:

an external shell;

at least a radial or axial-radial catalytic bed, provided with a gas inlet perforated cylindrical wall and a gas outlet perforated cylindrical wall, extended in said shell;

an unperforated cylindrical wall coaxial to said gas outlet wall in said catalytic bed, said unperforated cylindrical wall extending from an upper end of said gas outlet wall along a perforated portion of said gas outlet wall and for a predetermined length in said catalytic bed such that once the catalyst is loaded within said catalytic bed at least a portion of said unperforated cylindrical wall remains below the upper level reached by said catalyst, so as to define a free-space between the perforated gas outlet wall and the unperforated wall, for the passage of a part of the gas leaving said catalytic bed through said portion of the gas outlet wall facing said free-space, said free space having a thickness great enough to allow said passage without causing an additional pressure drop; and a cap which closes said free-space between the unperforated wall and the gas outlet wall, in proximity of the upper end of the latter, preventing thereby a bypass of said catalytic bed or a recycling to the catalytic bed of the gas entering and leaving the reactor respectively, wherein the catalytic bed is not closed at the top so as to allow for the passage of reaction gases.

2. The reactor according to claim 1, wherein said unperforated wall extends for a length corresponding to 5%-50% of the length of said gas outlet wall.

3. The reactor according to claim 1, wherein said free-space is substantially annular and has a thickness between 0.5 and 10 cm.

4. The reactor according to claim 1, wherein said unperforated wall is supported by said gas outlet wall (8).

5. The reactor according to claim 4, wherein said gas outlet wall has a diameter smaller than the diameter of said gas inlet wall and of said unperforated wall, wherein said unperforated wall is supported by a gas-tight horizontal baffle which protrudes above the upper end of said gas outlet wall, and rests on the same.

* * * * *